O. I. NIGH.
ELECTRIC LIGHTING SYSTEM AND CONTROL.
APPLICATION FILED MAR. 2, 1916.

1,269,954.

Patented June 18, 1918.
2 SHEETS—SHEET 1.

Witnesses
N. Abramson
E. S. Clement

Inventor
Omar I. Nigh,
By Bedford & Doolittle
Attorneys

O. I. NIGH.
ELECTRIC LIGHTING SYSTEM AND CONTROL.
APPLICATION FILED MAR. 2, 1916.

1,269,954.

Patented June 18, 1918.
2 SHEETS—SHEET 2.

Witnesses
N. Abramson
E. J. Clements

Inventor
Omar I. Nigh,
By Bradford S. Doolittle,
Attorneys

UNITED STATES PATENT OFFICE.

OMAR I. NIGH, OF WASHINGTON, DISTRICT OF COLUMBIA.

ELECTRIC-LIGHTING SYSTEM AND CONTROL.

1,269,954.                    Specification of Letters Patent.     Patented June 18, 1918.

Application filed March 2, 1916. Serial No. 81,702.

*To all whom it may concern:*

Be it known that I, OMAR I. NIGH, a citizen of the United States, residing at Washington, District of Columbia, have invented and discovered certain new and useful Improvements in Electric-Lighting Systems and Control, of which the following is a specification.

The present invention relates to lighting systems and controllers therefor, and consists in the combinations and arrangements of parts hereinafter described and particularly set forth in the accompanying claims.

The invention has for its purpose to provide a duplex electric lighting system for motor driven vehicles, having an auxiliary controlling switch in addition to the usual circuit controlling switch, whereby the headlights may be temporarily extinguished and the usual service lights substituted therefor, or vice versa, at any time during the operation of the vehicle (*e. g.* when one vehicle is passing another), and without requiring the operator of the car to remove his hands from the steering wheel.

A further purpose of the invention is to provide an auxiliary or temporary control for the lighting system that is operable by the foot of the driver in conjunction with the usual accelerator pedal.

Figure 1:
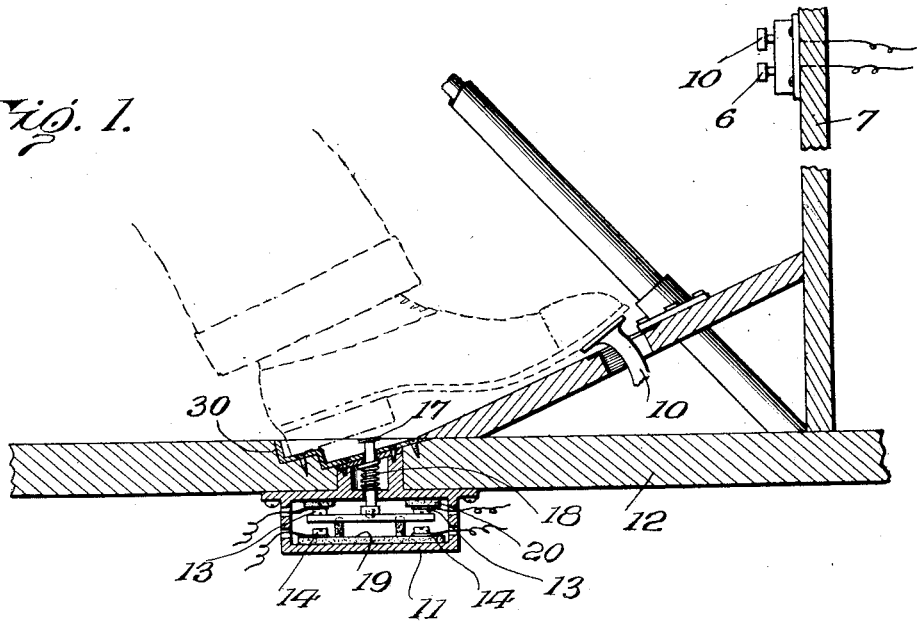
Figure 2:
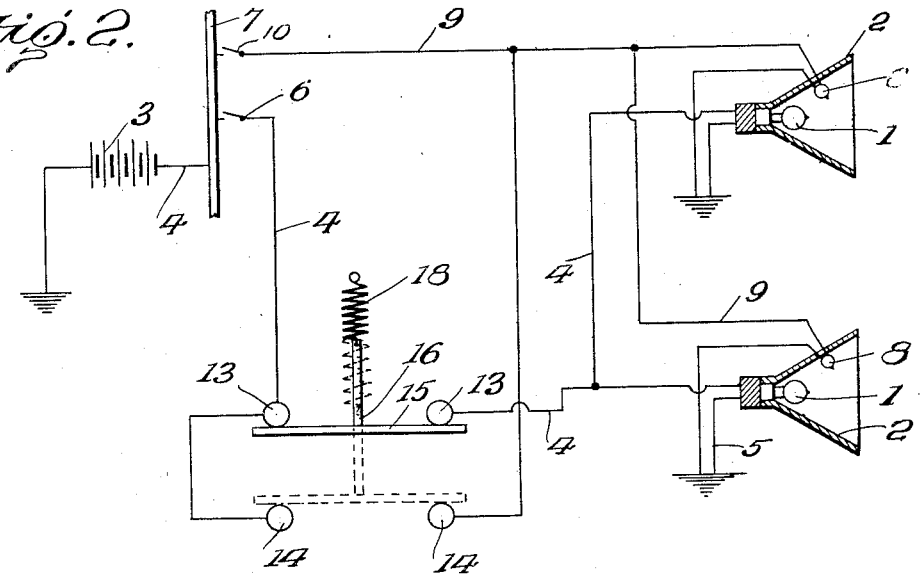
Figure 3:
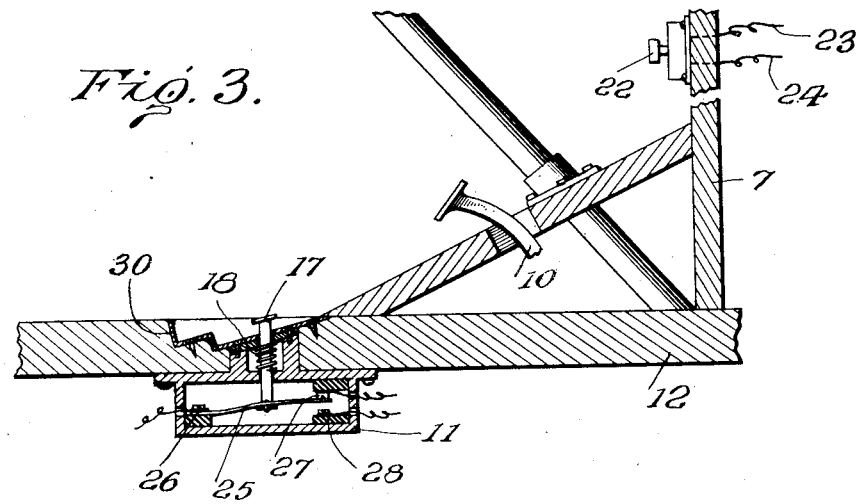
Figure 4:
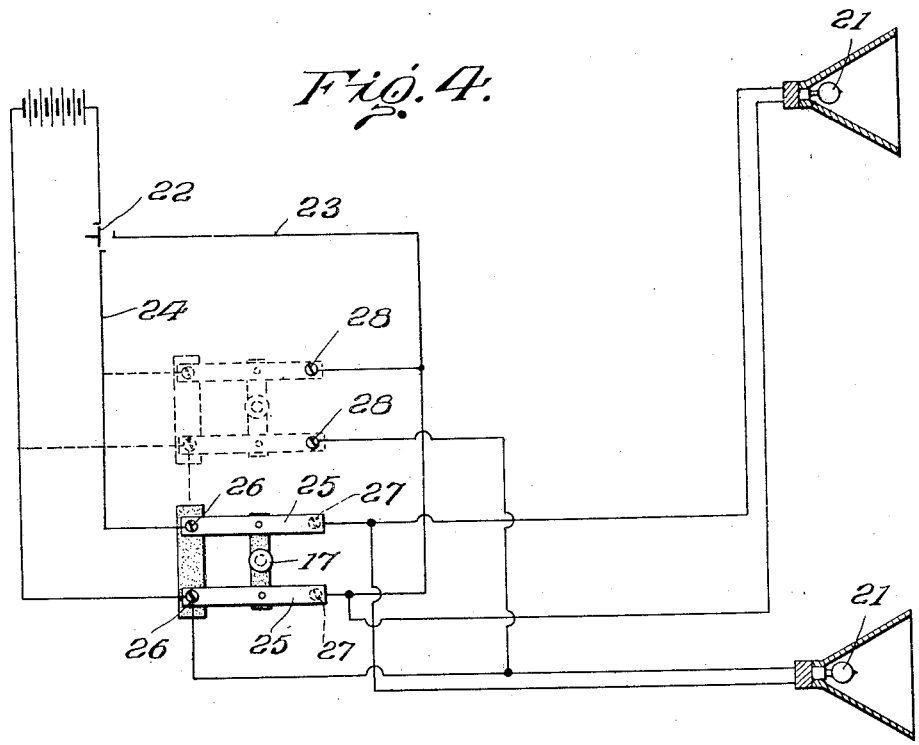

With the foregoing and other objects in view, the invention is disclosed by way of illustration in the accompanying drawings, wherein:

Figure 1 illustrates the application of the auxiliary switch control to the lighting system of a motor car, Fig. 2 a diagram of the duplex lighting system, Fig. 3 a view similar to Fig. 1, of a modified form of auxiliary control, and Fig. 4 is a diagrammatic view of the lighting system using the emergency type of control shown in Fig. 3.

Referring to the construction in further detail, 1 designates the lamps of the car headlights mounted within the reflectors 2 and connected to be operated from the battery 3 through conductors 4, and 5 designates the ground wires of the circuit. The lamps 1 have the usual hand-controlling switch 6 mounted on the dash 7 of the car.

The service lights consist of the usual secondary lamps 8 mounted on the reflectors and connected to the battery by the conductors 9, and controllable through the usual hand-operated switch 10 mounted adjacent the headlight controlling switch 6.

The auxiliary or emergency control for the headlight and service lighting systems consists of a switch mounted on the car adjacent the accelerator pedal 40 (see Fig. 1), to the end that the same may be operated by the foot of the driver from that position in which the foot is normally placed. Said switch consists of a suitable frame or casing 11 secured to the underside of the car 12 and having two pairs of terminals 13 and 14 connecting respectively with the conductors of the headlight and service lighting system of the car. A plate or contact member 15 is mounted on a foot-operated plunger 16 to operate within the casing and engage with either pair of said terminals to close one or the other of said circuits accordingly as the treadle 17 is in raised or lowered position. A spring 18 surrounds the plunger rod 16 and normally holds the foot piece 17 elevated and the contact member 15 engaging the terminal 13 when the circuit is normal, *i. e.* through the lamps 1.

It is oftentimes desired, and in fact necessary, to change from the usual headlight illumination to the service lighting system, as, for instance, in passing another vehicle on a dark highway, and this change is usually accomplished by means of the hand-controlling switches 6 and 10; but there is an objection to this, since the driver of the car is obliged to take one hand from the steering wheel, and the disadvantage of this will be obvious. It is therefore proposed to provide an arrangement whereby the desired change of lighting from one to the other system may be accomplished through the foot of the operator alone. And it is further proposed that this auxiliary or emergency control be such that the lighting system be restored to normal when the use of the emergency system has ceased.

To these ends the circuit through the lamps 1 of the headlights is broken through the disconnection of the terminals 13 and contact 15, and the lamps 8 are thrown into circuit by the engagement of the plate 15 with the pair of terminals 14 to the conductors 9.

The heel piece 30 of the emergency switch is stepped, as shown in Fig. 1, to the end that the heel of the operator's foot may have a firm support for the operation of the pedal 40, and also to give the necessary clearance for the foot piece 17 of the plunger, which is normally held in raised position, as shown in Fig. 1. The casing 11 of the switch, and the terminals 13 of the conductors entering therein, are provided with suitable insulations 19 and 20.

In the arrangement shown in Figs. 3 and 4, the invention is applied to that type of illumination wherein the lamps of the headlights are adapted to be dimmed for the purpose of service lighting. In this system the lamps 21 are adapted to be connected either in series or in parallel, by the controlling switch 22 and the conductors 23 and 24, respectively.

The switch employed in this instance consists of a pair of contact members 25 suitably secured at one end 26 within the housing and adapted to engage with the terminals 27 and 28 of the respective parallel or series circuits, as desired. In normal position, the contacts 25 connect the terminals 27 when the usual headlight system is in operation, i. e. with the lamps in parallel circuit. The connection of the pair of terminals 28 for throwing the lamps in series is effected by the downward movement of the switch, as in the other instance. The general construction and manner of operation of the switch are, in all other respects, the same as that above described.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to protect by Letters Patent, is:

1. The combination with a motor driven vehicle having a treadle controlling means, of a lighting means, and a switch control for the lighting system located within a foot length of said treadle, said switch operable independently of said treadle control but by the foot and simultaneously with the operation of the treadle, substantially as set forth.

2. The combination with a motor driven vehicle having a treadle controlling means comprising a heel piece, of a lighting system, and a switch control for the lighting system located at the heel piece and operable by the heel of the foot conjointly with the treadle, substantially as set forth.

3. The combination with a motor driven vehicle having a treadle controlling means comprising a heel piece, of a main lighting system, an auxiliary lighting system associated therewith, a hand controlling means for said lighting systems, and a foot controlling means for said lighting systems located at said heel piece and operable conjointly with the treadle control, substantially as set forth.

In witness whereof, I have hereunto set my hand and seal at Washington, District of Columbia, this twenty-eighth day of February, A. D. nineteen hundred and sixteen.

OMAR I. NIGH. [L. S.]

Witnesses:
E. W. BRADFORD,
L. I. McBATH.